United States Patent
Salomon et al.

(10) Patent No.: US 11,961,166 B2
(45) Date of Patent: Apr. 16, 2024

(54) INFORMATION-ADAPTIVE REGULARIZATION FOR ITERATIVE IMAGE RECONSTRUCTION

(71) Applicant: KONINKLIJKE PHILIPS N.V., Eindhoven (NL)

(72) Inventors: Andre Frank Salomon, Aachen (DE); Andreas Goedicke, Aachen (DE); Chuanyong Bai, Solon, OH (US); Andriy Andreyev, Willoughby Hills, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 815 days.

(21) Appl. No.: 16/468,968

(22) PCT Filed: Dec. 12, 2017

(86) PCT No.: PCT/EP2017/082298
§ 371 (c)(1),
(2) Date: Jun. 12, 2019

(87) PCT Pub. No.: WO2018/108848
PCT Pub. Date: Jun. 21, 2018

(65) Prior Publication Data
US 2019/0355158 A1 Nov. 21, 2019

Related U.S. Application Data (60) Provisional application No. 62/433,981, filed on Dec. 14, 2016.

(51) Int. Cl.
G06T 11/00 (2006.01)
G01T 1/29 (2006.01)
G06T 5/00 (2006.01)

(52) U.S. Cl.
CPC .......... G06T 11/006 (2013.01); G01T 1/2985 (2013.01); G06T 5/002 (2013.01);
(Continued)

(58) Field of Classification Search
CPC ............ G06T 11/006; G06T 2211/424; G06T 11/008; G06T 2207/10081; G06T 2207/10104; G06T 2207/20192
See application file for complete search history.

(56) References Cited

U.S. PATENT DOCUMENTS

| 8,233,682 B2 | 7/2012 | Fessler |
| 8,655,033 B2 | 2/2014 | Zeng |

(Continued)

OTHER PUBLICATIONS

Ahmad, Munir et al "Local and Non-Local Regularization Techniques in Emission (PET/SPECT) Tomographic Image Reconstruction Methods". Journal of Digital Imaging. vol. 29. No. 3. Dec. 2015. dd. 394-402 (Year: 2015).*

(Continued)

*Primary Examiner* — Ross Varndell (57) ABSTRACT

Imaging data (20) are acquired by a PET scanner (6) or other imaging device. Iterative image reconstruction of the imaging data is performed to generate a reconstructed image (22). The iterative image reconstruction includes performing an update step (24) that includes an edge preserving prior (28) having a spatially varying edge preservation threshold (30) whose value at each image voxel depends on a noise metric (32) in a local neighborhood of the image voxel. The noise metric may be computed as an aggregation of the intensities of neighborhood image voxels of the reconstructed image in the local neighborhood of the image voxel. The edge preserving prior may be a Relative Difference Prior (RDP). For further noise suppression, during the iterative image reconstruction image values of image features of the reconstructed (Continued)

image that have spatial extent smaller than a threshold (38) may be reduced.

18 Claims, 5 Drawing Sheets

(52) U.S. Cl.
    CPC .............. *G06T 2207/10104* (2013.01); *G06T 2207/20004* (2013.01); *G06T 2207/20192* (2013.01); *G06T 2210/41* (2013.01); *G06T 2211/424* (2013.01)

(56) References Cited

U.S. PATENT DOCUMENTS

| | | | |
|---|---|---|---|
| 9,478,049 B2 | 10/2016 | Bippus | |
| 2014/0126794 A1 | 5/2014 | Ahn | |
| 2016/0195597 A1 | 7/2016 | Huang | |
| 2017/0294034 A1* | 10/2017 | Zhou | ............... G06T 11/008 |

OTHER PUBLICATIONS

Hutton, B.F. et al "Iterative Reconstruction Methods", Quantitative Analysis in Nuclear Medicine Maging, Jan. 2006, pp. 107-140 (Year: 2006).*

S. Ribes et al., "Automatic Segmentation of Breast MR Images Through a Markov Random Field Statistical Model," in IEEE Transactions on Medical Imaging, vol. 33, No. 10, pp. 1986-1996, Oct. 2014, doi: 10.1109/TMI.2014.2329019. (Year: 2014).*

Hutton, B.F. et al "Iterative Reconstruction Methods", Quantitative Analysis in Nuclear Medicine Imaging, Jan. 2006, pp. 107-140.

Ahmad, Munir et al "Local and Non-Local Regularization Techniques in Emission (PET/SPECT) Tomogrpahic Image Reconstruction Methods", Journal of Digital Imaging, vol. 29, No. 3, Dec. 2015, pp. 394-402.

Li, S.Z. "Close-Form Solution and Parameter Selection for Convex Minimization-Based Edge-Preserving Smoothing", IEEE Transactions on Pattern Analysis and Machine Intelligence, vol. 20, No. 9, Sep. 1998, pp. 916-932.

Le, Yi et al "Tumor Boundary Detection in Ultrasound Imagery using Multi-Scale Generalized Gradient Vector Flow", Journal of Medical Ultrasonics, vol. 42, No. 1, Aug. 2014, pp. 25-38.

Russ, John C. "Correcting Image Defects" The Image Processing Handbook, Jan. 2011, pp. 199-267.

Kobayashi, Tetsuya et al "Fusion of Image Reconstruction and Lesion Detection using a Bayesian Framework for PET/SPECT", Nuclear Science Symposium Conference Record, 2008, pp. 3617-3624.

Wang, Guobao et al Penalized Likelihood PET Image Reconstruction using Patch-Based Edge-Preserving Regularization, IEEE Transactions on Medical Imaging, vol. 31, No. 12, Dec. 2012, pp. 2194-2204.

International Search Report and Written Opinion for PCT/EP2017/082298, dated Mar. 27, 2018.

Lalush, David S. et al "Space-Time Gibbs Priors Applied to Gated SPECT Myocardial Perfusion Studies", Computational Imaging and Vision Book Series, CIVI, vol. 4, Mar. 9, 2013.

* cited by examiner

INFORMATION-ADAPTIVE REGULARIZATION FOR ITERATIVE IMAGE RECONSTRUCTION

CROSS-REFERENCE TO PRIOR APPLICATIONS

This application is the U.S. National Phase application under 35 U.S.C. § 371 of International Application No. PCT/EP2017/082298, filed on Dec. 12, 2017, which claims the benefit of U.S. Provisional Patent Application No. 62/433,981, filed on Dec. 14, 2016. These applications are hereby incorporated by reference herein.

FIELD

The following relates generally to the medical imaging arts, positron emission tomography (PET) imaging and image reconstruction arts, single photon emission computed tomography (SPECT) imaging and image reconstruction arts, transmission computed tomography (CT) imaging and image reconstruction arts, regularized iterative image reconstruction arts, and related arts.

BACKGROUND

In iterative image reconstruction of PET, SPECT, CT or other image data, an edge-preserving prior is sometimes used in the update step to provide smoothing while preserving edges. In general, a prior adds prior knowledge beyond the measured imaging data into the image reconstruction. An edge preserving prior adds extra knowledge that the image is expected to be generally smooth thereby reducing noise, but also includes a mechanism to protect (real) image features from being inappropriately smoothed out.

One example of an edge preserving prior is the Relative Difference Prior (RDP). Here, an edge preservation threshold $\gamma$ is employed to control the balance between smoothing and image feature preservation. For RDP, a larger $\gamma$ produces less smoothing (i.e. less penalty for lack of smoothness) so as to provide stronger edge preservation at the cost of less smoothing, while a smaller $\gamma$ produces more smoothing (more penalty for lack of smoothness) at the cost of a higher likelihood of suppressing real image features.

The following discloses a new and improved systems and methods.

SUMMARY

In one disclosed aspect, an imaging device comprises a radiation detector array arranged to acquire imaging data, a computer, and a non-transitory storage medium storing instructions readable and executable by the computer to perform an image reconstruction method including: performing iterative image reconstruction of the acquired imaging data to generate a reconstructed image; and, during the iterative image reconstruction, applying an edge preserving prior having a spatially varying edge preservation threshold whose value at each image voxel depends on a noise metric in a local neighborhood of the image voxel.

In another disclosed aspect, a non-transitory storage medium stores instructions readable and executable by a computer to perform an image reconstruction method comprising performing iterative image reconstruction of projection imaging data to generate a reconstructed image. The iterative image reconstruction includes performing an update step that includes an edge preserving prior having a spatially varying edge preservation threshold whose value at each image voxel depends on an amount of the imaging data contributing to the reconstructed image in a local neighborhood of the image voxel.

In another disclosed aspect, an image reconstruction method is disclosed. Iterative image reconstruction of projection imaging data is performed to generate a reconstructed image. During the iterative image reconstruction, image values of image features of the reconstructed image that have spatial extent smaller than a threshold are penalized. The iterative image reconstruction and the penalizing of image values of image features that have spatial extent smaller than the threshold are performed by a computer.

One advantage resides in providing an iterative reconstruction employing an edge preserving prior with improved robustness against data sparseness.

Another advantage resides in providing an iterative reconstruction employing an edge preserving prior that produces reconstructed images with improved image quality.

Another advantage resides in providing an iterative reconstruction with reduced susceptibility to generating spurious image features.

Another advantage resides in providing an iterative reconstruction with reduced susceptibility to generating spurious image features.

Another advantage resides in providing an iterative reconstruction with employing an edge preserving prior with localized automatic adaptation.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION

The following discloses certain improvements in iterative image reconstruction with edge preserving priors. Some of these improvements are premised in part on the insight that strong edge preservation can produce spurious (i.e. artificial) image features. In the case of medical imaging for tasks such as suspicious lesion detection, these spurious image features are susceptible to misinterpretation as lesions. Without being limited to any particular theory of operation, it is believed that the spurious image features result from noise in the underlying imaging data being reconstructed into image noise of magnitude sufficient to exceed the threshold above which noise preservation by the edge-preserving prior becomes operative. In subsequent iterations, the edge preservation then operates to preserve and amplify the noise into observable spurious image features.

It is further recognized herein that local noise correlates inversely with the amount of the imaging data contributing to the reconstructed image in the local neighborhood. That is, image regions to which less imaging data contribute are noisier, and hence more likely to exhibit spurious image features by action of an edge preserving prior.

Another insight is that insipient spurious image features are distinguishable from physical (i.e. "real") image features in many instances. This is because as noise grows into a spurious feature it is likely to have spatial extent that is smaller than the resolution of the imaging device. By contrast, the spatial extent of a real image feature is expected to be of order of the resolution of the imaging device or larger.

Partly in consideration of these insights, improvements disclosed herein provide improved iterative image reconstruction by employing an edge preserving prior having a spatially varying edge preservation threshold whose value at each image voxel depends on a noise metric in a local neighborhood of the image voxel. In some embodiments, the noise metric is based on the amount of imaging data contributing to the local image content, and hence the value at each image voxel of the spatially varying edge preservation threshold depends in these embodiments on an amount of the imaging data contributing to the reconstructed image in a local neighborhood of the image voxel.

Additionally or alternatively, the improved iterative image reconstruction disclosed herein includes a "hot spot suppression" aspect which reduces image values of image features of the reconstructed image that have spatial extent smaller than a threshold. The threshold is chosen to suppress image features whose spatial extent is smaller than the resolution of the image, such that the image feature of such small spatial extent is unlikely to be a real image feature. It will be appreciated that this hot spot suppression aspect can be employed alone or in combination with a spatially varying edge preservation threshold.

Figure 1:
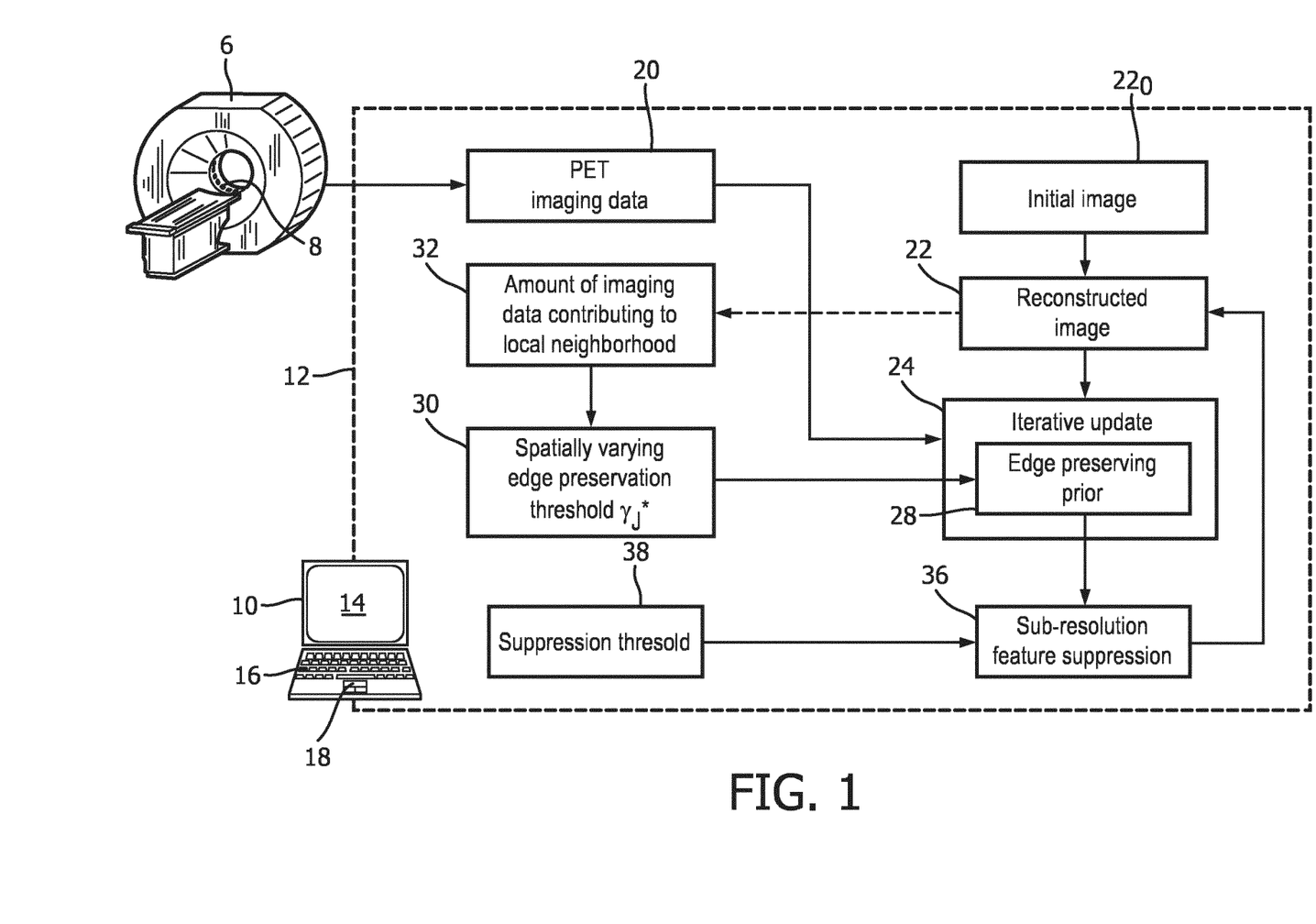
FIG. 1 diagrammatically illustrates an imaging system including an imaging device and an image reconstruction device as disclosed herein.

With reference to FIG. 1, an illustrative imaging device comprises a positron emission tomography (PET) imaging device (also sometimes referred to as a PET scanner) 6 that includes a PET detector array 8, and an electronic processor 10 programmed to process imaging data acquired by the PET imaging scanner 6 to generate one or more reconstructed PET images. Processing performed by the electronic processor 10 is diagrammatically indicated in FIG. 1 by way of a dashed box 12 enclosing blocks graphically representing data and operations of the processing flow. The PET detector array 8 acquires counts of oppositely directed 511 keV gamma ray pairs along lines of response (LORs). The counts may or may not include time of flight (TOF) localization. By way of some non-limiting illustrative examples, the illustrative PET imaging scanner 6 may be the PET gantry of a Vereos™ Digital PET/CT scanner or an Ingenuity™ TF PET scanner, both available from Koninklijke Philips N. V., Eindhoven, the Netherlands. It may be noted that while the PET detector array 8 is shown as a detector array ring which is visible on the inside circumference of the bore of the PET scanner 6, this is for illustrative purposes and more typically the PET detector array is occluded from view by a cosmetic bore liner or the like which passes 511 keV radiation.

The electronic processor 10 may, for example, be embodied as a computer 10 (e.g. a desktop computer, network-based server computer, a dedicated PET control computer, various combinations thereof, or so forth) that executes instructions read from one or more non-transitory storage media (e.g. one or more hard drives, optical disks, solid state drives or other electronic digital storage devices, various combinations thereof, or so forth) that stores the instructions. The computer 10 typically includes or has operative access to at least one display 14 (e.g. an LCD display, plasma display, or so forth), and may also optionally include or have operative access to at least one user input device via which a user can input information. The illustrative user input devices include a keyboard 16 and a trackpad 18; some other typical user input devices include a mouse, a touch-sensitive overlay of the display 14, and/or so forth.

While the illustrative embodiment is directed to PET imaging, the disclosed approaches for iterative image reconstruction with an edge-preserving prior may be applied to other types of imaging that generate projection imaging data that are susceptible to being reconstructed by way of an iterative image reconstruction. For example, the disclosed approaches for iterative image reconstruction with an edge-preserving prior may be applied to reconstruct projection imaging data acquired by a gamma camera in single photon emission computed tomography (SPECT) imaging, or imaging data acquired by a transmission computed tomography (CT) imaging device.

With continuing reference to FIG. 1, the PET detector array 8 acquires counts along LORs which form a PET imaging data set 20, which may or may not have time-of-flight (TOF) localization information along the LORs. A reconstructed image 22 is initialized, e.g. as a uniform-intensity image $22_0$ or as some other initial image $22_0$ based on some prior information, and the PET imaging data 20 are reconstructed by an iterative image reconstruction which includes iteratively applying an iterative update 24 to the reconstructed image 22 to increase fidelity of the forward-projected image 22 to the imaging data 20. The update step 24 includes applying an edge preserving prior 28 having a spatially varying edge preservation threshold 30. In the illustrative example, the spatially varying edge preservation threshold 30 is computed based on the amount of the imaging data 32 contributing to the reconstructed image 22 in the local neighborhood of each image voxel. This amount 32, in turn, can be computed based on (the current iteration of) the reconstructed image 22, e.g. as an aggregation of the intensities of neighborhood image voxels of the reconstructed image 22 in the local neighborhood of the image voxel for which the local preservation threshold 30 is computed.

To further reduce spurious image features, the illustrative embodiment of FIG. 1 further includes a hot spot suppression operation 36 in which sub-resolution image features are suppressed. A sub-resolution image feature is one whose spatial extent is less than a threshold 38. The suppression threshold 38 is chosen to be sufficiently smaller than the image resolution provided by the PET imaging scanner 6 so that a feature whose spatial extent is smaller than the threshold 38 is unlikely to be a "real" image feature because the PET imaging scanner 6 is incapable of resolving such a small feature. An image feature whose lateral extent is smaller than the threshold 38 is therefore likely to be a hot spot, that is, a region where noise has been amplified by the iterative reconstruction process to produce spuriously high intensity that does not correspond to a physical feature of the imaged subject.

Figure 2:
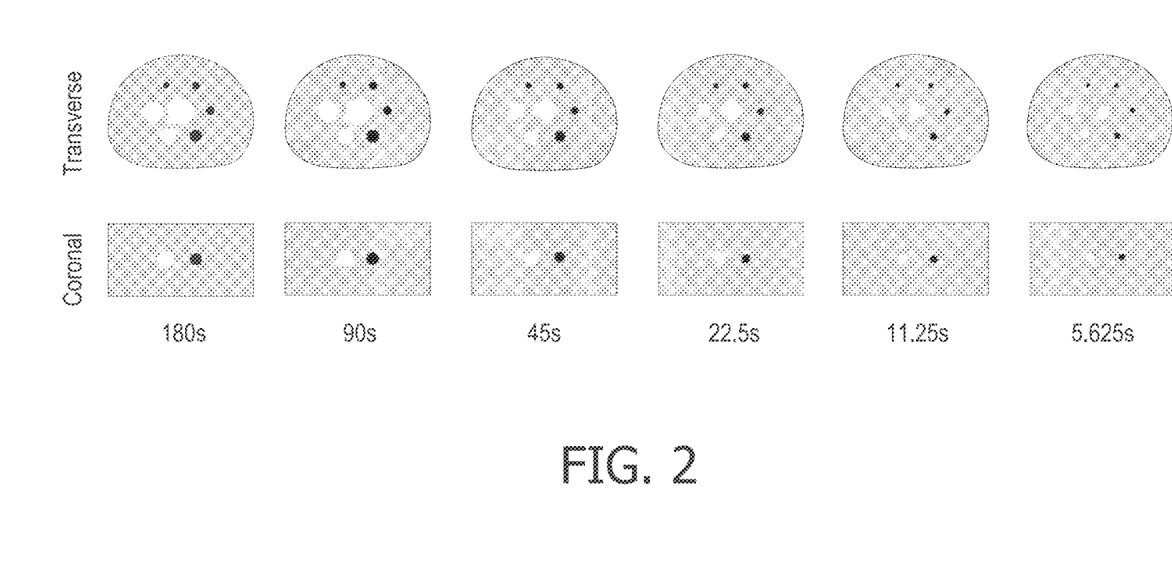
FIGS. 2 and 3 illustrate phantom imaging results as described herein.

With reference to FIG. 2, reconstructed activity images of a NEMA IQ phantom are shown for several varying acquisition durations as labeled in FIG. 2. As can be seen, the image quality degrades with decreasing acquisition time, which corresponds to reduced amount of imaging data for reconstructing the image. Thus, the noise level inversely correlates with amount of imaging data, i.e. more imaging data (longer acquisition time in FIG. 2) translates to reduced noise. Identifying suspicious lesions down to the (partially) scanner specific PET resolution limit (determined by the detector geometry, crystal dimensions, positron range, sensitivity, etc.) is advantageous for performing clinical diagnoses using PET imaging. However, as seen in FIG. 2, noise textures can sometimes produce spurious image features that can be difficult or impossible to distinguish from actual image features (like small low-active lesions) and reduce the so-called feature detectability. It is noted that in FIG. 2, the different acquisition times is used as a surrogate for different phantom/lesion activity levels, which also produces different amounts of data.

The disclosed approaches enable the image reconstruction to effectively distinguish between noise and features (lesions), so as to improve the detectability and specificity in emission tomographic images. Further, the improved image reconstruction techniques are expected to achieve convergence after a finite number of iterations and remain stable for further iterations. A further advantage of the disclosed approaches is that no parameters need to be manually adjusted per each individual case of acquired data, since the parameters (e.g. the spatially varying edge preservation threshold 30) are adaptive to the acquired data of each individual study automatically, and are also adaptive to the local information of the patient body.

In approaches disclosed herein, a Relative Difference Prior (RDP) or other edge-preserving prior 28 used during iterative reconstruction updates 24 is automatically adapted to the measured information, e.g. count statistics, in order to achieve improved image quality in terms such as reduced noise while preserving contrast and standardized uptake values (SUVs). Once calibrated using a sample data set, no parameters need to be tweaked for new PET data acquisitions. Another advantage of the disclosed approaches is that the spatially varying edge preservation threshold 30 is automatically adapted to the local information associated with the acquired data, this allows for different regularization for different parts of the patient body, such as lungs vs abdomen.

In embodiments employing the disclosed hot spot suppression 36, artificial bright spots from the noise amplification in regularized reconstruction with edge-preserving priors are effectively removed by introduction of a spatial resolution prior which removes features from the image which are "too good to be true" because they have a spatial extent that is smaller than the achievable spatial resolution of the imaging device 6. For example, in some non-limiting illustrative embodiments the suppression threshold 38 is set to suppress features whose spatial extent is less than 3 mm diameter, while the PET imaging device 6 has spatial resolution of 4 mm or larger (as is typical for some existing commercial clinical PET imaging devices).

For setting the spatially varying edge preservation threshold 30, in some embodiments a minimum information, i.e., count density threshold is defined to effectively apply the RDP or other edge-preserving prior. For those low information regions, where the estimated count density is lower than the threshold, RDP automatically adapts the parameters to essentially use quadratic prior for local regularization, turning off the edge preservation for increased stability of the iterative reconstruction.

In the following, an illustrative example is described, in which the edge-preserving prior is a Relative Difference Prior (RDP) and ordered subset expectation maximization (OSEM) reconstruction. The illustrative penalized iterative OSEM reconstruction using RDP can be written as:

$$\lambda_j^{n+1} = \lambda_j^n + \frac{\lambda_j^n}{s_j} \frac{\partial}{\partial \lambda_j} \left[ \sum_{i=1}^N y_i \log\left(\sum_{j=1}^p a_{ij}\lambda_j^n + r_i\right) - \left(\sum_{j=1}^p a_{ij}\lambda_j^n + r_i\right) \right] \bigg\} MLEM - \qquad (1)$$

$$\frac{\lambda_j^n}{s_j} \frac{\partial}{\partial \lambda_j} \left[ \sum_{k \in N_j} \beta_{kj}^* \frac{(\lambda_j - \lambda_k)^2}{\lambda_j + \lambda_k + \gamma|\lambda_j + \lambda_k|} \right] \bigg\} RDP - \text{Penalizer}$$

where $\lambda_j$ is the estimated activity at voxel index $$j, \beta_{kj}^* = \frac{w_k \beta_j}{\sum_{\forall k} w_k}$$

is a local penalty weighting factor, $a_{ij}$ is the system matrix value, i.e., the contribution of voxel j counting from 1 to P to projection data index i counting from 1 to N, $s_j$ the total scanner sensitivity at voxel j scaled with the acquisition time, and parameter $\gamma > 0$ for steering the Gibbs prior (responsible for edge preservation threshold). Prior is estimated over local image neighborhood $N_j$. In general, a larger $\gamma$ produces greater edge preservation. The value $\gamma=0$ eliminates edge preservation entirely, and the RDP becomes a quadratic prior.

In general, the disclosed information-adaptive prior reconstruction estimates a local value for $\gamma$ at voxel j (in Equation 1) based on the estimated statistical noise level, i.e., the standard deviation $\sigma_{r_j}$. In the disclosed approach, $\gamma$ in Equation (1) is replaced by:

$$\gamma_j^* = \frac{\gamma}{\sigma_{r_j}} \qquad (2)$$

where $\gamma_j^*$ is a spatially varying edge preservation threshold whose value at each image voxel j depends on a noise metric $\sigma_{r_j}$ in a local neighborhood of the image voxel j. In this modified RDP, all relative differences below $1/\gamma_j^*$ are effectively smoothed while higher relative differences are detected as features and are preserved in the estimated activity distribution during the iterative reconstruction. Thus, stronger edge preservation is provided when the noise metric indicates lower noise in the local neighborhood of the image voxel, and weaker edge preservation is provided when the noise metric indicates higher noise in the local neighborhood of the image voxel.

Parameter $\beta_j$ is replaced by $\beta'/s_j$ where $\beta'$ is a global constant which is set to $\beta'=1$ by default, in order to provide the maximum smoothing without producing instabilities, especially near the edges of the PET axial field of view (FOV) where local sensitivity $s_j$ is close to zero.

The resulting update scheme for iRDP with $\beta'=1$ can be written as:

$$\lambda_j^{n+1} = \lambda_j^n + \frac{\lambda_j^n}{s_j} \frac{\partial}{\partial \lambda_j} \left[ \sum_{i=1}^N y_i \log\left(\sum_{j=1}^p a_{ij}\lambda_j^n + r_i\right) - \left(\sum_{j=1}^p a_{ij}\lambda_j^n + r_i\right) \right] \bigg\} OSEM - \qquad (3)$$

-continued $$\lambda_j^n \frac{\partial}{\partial \lambda_j} \left[ \sum_{k \in N_j} \left( \frac{w_k}{\sum_{\forall k} w_k} \right) \frac{(\lambda_j - \lambda_k)^2}{\lambda_j + \lambda_k + \gamma_j^* |\lambda_j - \lambda_k|} \right] \right\} RDP - \text{Penalty term}$$

where:

$$\gamma_j^* = \gamma \sqrt{(G_\sigma \times \lambda)_j \cdot s_j} \quad (4)$$

includes a Gaussian smoothing operator $G_\sigma$ with a local smoothing strength equal to the expected scanner resolution (e.g., 4 mm FWHM for the commercial Philips Vereos® PET/CT scanner). The term $G_\sigma$ provides a practical benefit in that the estimate of $\gamma_j^*$ should ideally be not affected by statistical noise. Corresponding filter strength $G_\sigma$ is linked to the spatial resolution of the scanner. Other than the Gaussian smoothing operators can be considered (e.g., box filter). Thus, the modified RDP of Equations (3) and (4) provides stronger edge preservation when the amount of the imaging data contributing to the reconstructed image in the local neighborhood of the image voxel is higher, and provides weaker edge preservation when the amount of the imaging data contributing to the reconstructed image in the local neighborhood of the image voxel is lower.

The formulation for $\gamma_j^*$ may optionally be further adjusted depending on the visual perception of reconstructed images as well as on other parameters such as e.g. the blob size defined for non-voxel reconstruction (blob-based) frameworks. If $\gamma_j^*$ is set too low, the probability that features are suppressed becomes high, while for too high values of $\gamma_j^*$ the regularization effect disappears since statistical noise is also preserved in the images.

A general problem addressed by RDP is the distinction between noise and actual features in the image. However, it is recognized herein that, for statistical reasons, the method fails when the information gathered about a spatial region reaches a lower limit (i.e., the amount of the imaging data contributing to the region is too low). In such a sparse data situation, the RDP can actually cause the generation and amplification of spurious features, i.e. hot-spot artifacts. Once a certain noise spike gets past the edge preservation threshold, it may also get iteratively amplified by resolution recovery and reach unrealistically high contrast values. The likelihood to generate those artifacts increases with increasing value of the edge preservation threshold $\gamma$.

Figure 3:
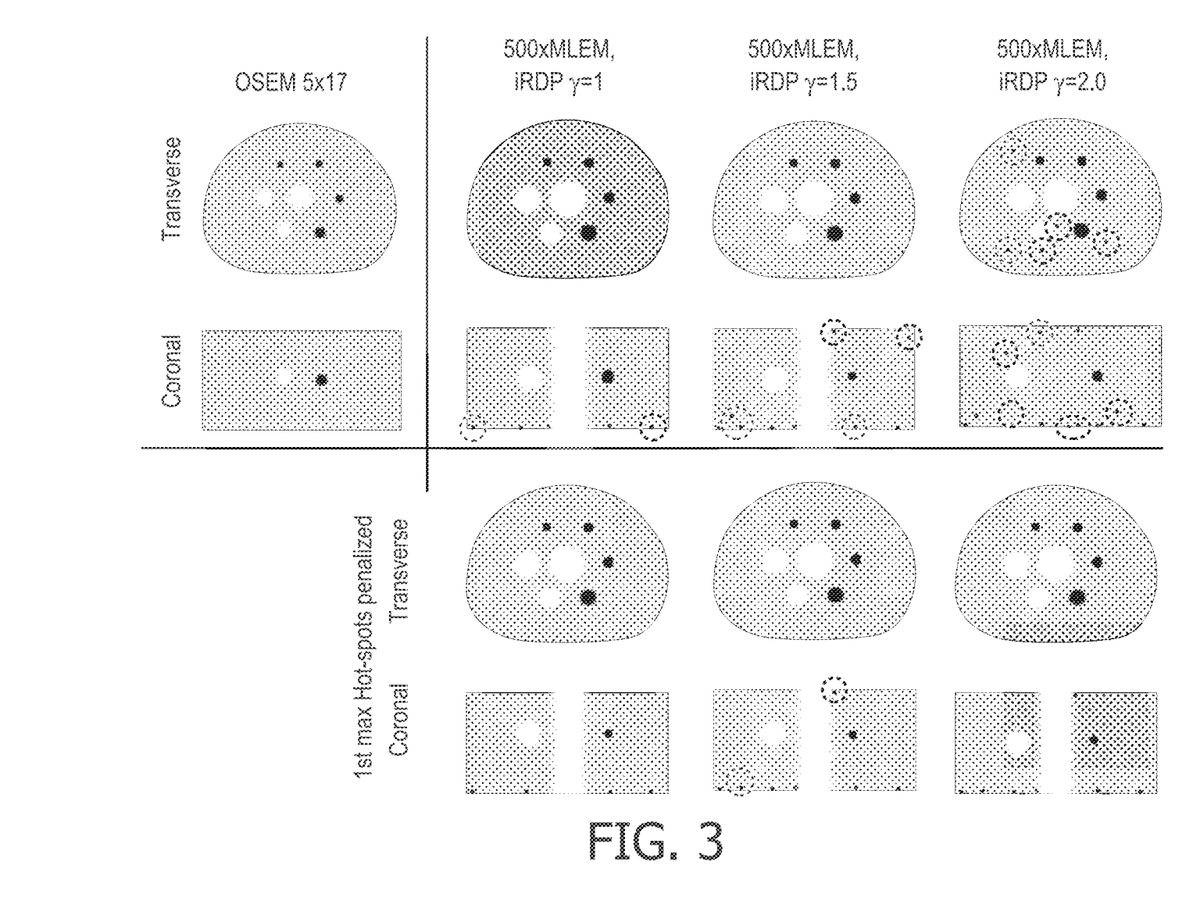

With reference to FIG. 3, this effect is illustrated. FIG. 3 shows reconstruction results exhibiting introduced hot-spot artifacts with increasing values for the edge preservation threshold $\gamma$ in first two rows, and corresponding results with hot-spot correction in of Equations (3) and (4) in the third and fourth rows. Each spurious hot-spot is marked in FIG. 3 by a small circle.

In a contemplated variant, since the scanner's sensitivity and statistical information density linearly decreases with increasing axial distance from the iso-center, a minimum local information density $n_{min}$ has been identified using the NEMA IQ phantom by investigating in the image regions where noise artifacts start to occur towards axial FOV boundaries. The corresponding analysis, including empirical inspection of a reconstructed data set from the NEMA IQ phantom at different count levels, resulted in a minimum number of approximately 20 counts/blob to reliably operate the RDP. For lower local count statistics the statistical noise becomes unacceptably prominent, and due to the limited distance to neighbors of each blob, the relative differences in each image update cannot be cancelled out by RDP. To incorporate this limit, Equation (4) can be modified as follows:

$$\gamma_j^* = \begin{cases} \gamma \sqrt{(G_\sigma \times \lambda)_j \cdot s_j} & \text{if } (G_\sigma \times \lambda)_j \cdot s_j > n_{min} \\ 0 & \text{otherwise} \end{cases} \quad (5)$$

Equation (5) uses a quadratic prior ($\gamma_j^*=0$) instead of RDP if the local statistical information is insufficient, that is, if the measured number of decays is lower than $n_{min}$ in the neighborhood of a voxel $\lambda_j$. Thus, no edge preservation is provided when the amount of the imaging data $(G_\sigma \times \lambda)_j \cdot s_j$ contributing to the reconstructed image in the local neighborhood of the image voxel is less than the threshold $n_{min}$.

Next, an illustrative embodiment of the sub-resolution feature suppression 36 of FIG. 1 is described.

In observing the iterative reconstruction evolution of images such as those of FIGS. 2 and 3, it was found that almost all spurious image features are being represented by only a single voxel (or a single blob in the case of blob-based reconstruction). However, the achievable image resolution of the corresponding PET scanners is larger than a single voxel, and hence it is reasonable to expect that each real feature will cover more than a single blob or voxel. In view of this, actual features and spurious hot-spots are distinguishable by taking the number of blobs/voxels, i.e. the spatial extent, of the feature into account. For this, the minimum size of features covering more than a single blog/voxel is the minimum distance between two neighboring blobs. Here, this distance is 3.1 mm, which is smaller than the spatial scanner resolution of 4.0 mm.

In one suitable approach, those blobs/voxels showing significantly higher values than all their neighbors are penalized. In experiments, this approach was tested by estimating that a hot-spot needs to have at least 20% higher value than its highest neighboring value $\lambda_{max}$ before it is removed by being set equal to $\lambda_{max}$. This is referred to herein as first-order hot-spot correction, since it compares each focused voxel value with its highest neighbor. This leads to an additional penalty term to be applied in the sub-resolution feature suppression operation 36 after each image update:

$$\lambda_j = \begin{cases} \max(\lambda_k | \forall k) & \text{if } \lambda_j \geq \Delta_{max} \cdot \max(\lambda_k | \forall k) \\ \lambda_j & \text{otherwise} \end{cases} \quad (6)$$

where it was found that $\Delta_{max}=1.2$ provided satisfactory results. In Equation (6), $\lambda_j$ denotes an image voxel of the reconstructed image 22, and $\forall k$ denotes the set of image voxels in the neighborhood around $\lambda_j$. Note that in alternate implementations $\lambda_j$ can be penalized proportional to other functions such as median or mean value of neighbors, i.e. $\max(\lambda_k|\forall k)$ can be generalized to $f(\lambda_k|\forall k)$ where $f(\cdot)$ is $\max(\cdot)$ in the illustrative example of Equation (6) but could more generally be some other function such as $\text{mean}(\lambda_k|\forall k)$.

With re-tuning of the blob/voxel grid to match the spatial resolution of the imaging device, the above penalty term is expected to effectively suppress all hot-spots occurring as single blobs/voxels. All useful real features that should be represented by several image volume elements, and hence should be preserved by the suppression approach of Equation (6).

If the reconstruction is tuned so that larger spurious hot-spots can occur with more than a single voxel or blob involved, the central voxel value can be instead compared with its second highest neighbor, yielding a second-order hot-spot correction. For more robustness, both (or further extended) approaches can be combined, e.g. both first-order and second-order hot-spot correction can be applied. The $\Delta_{max}$ value can also be tuned to account for spatially-variant point spread function (PSF) of the imaging device.

Figure 4:
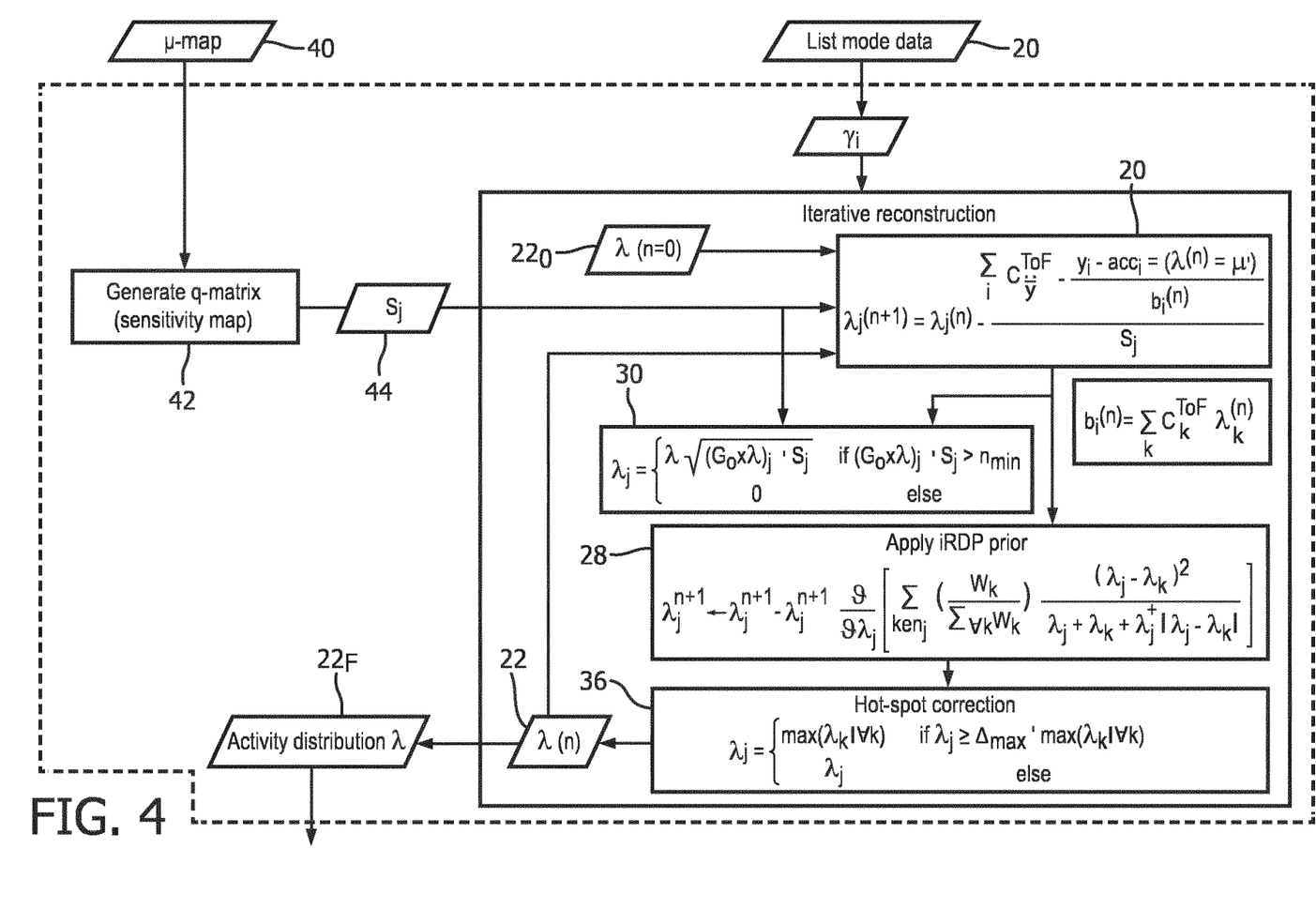
FIG. 4 diagrammatically illustrates an embodiment of the imaging system of FIG. 1 employing the illustrative example of iterative ordered subset expectation maximization (OSEM) reconstruction with a Relative Difference Prior (RDP).

With reference to FIG. 4, the illustrative embodiment of the system of FIG. 1 employing the OSEM with RDP of Equations (3) and (5) with the embodiment of the sub-resolution feature suppression 36 set forth via Equation (6) is presented. In addition to the components already described with reference to like reference numbers in FIG. 1, the illustrative example of FIG. 4 also explicitly depicts the use of an attenuation map (pt-map) 40 of the subject, which an operation 42 processes to generate the q-matrix (sensitivity map) terms $s_j$ 44 used in the iterative update 24 of Equation (3). FIG. 4 also shows, in addition to the initial image $22_0$, the final image $22_F$ which is outputted upon reaching a chosen stopping criterion for the iterative reconstruction (e.g. a preset number of iterations, or an iteration-over-iteration change of less than some stopping threshold, etc).

Figure 5:
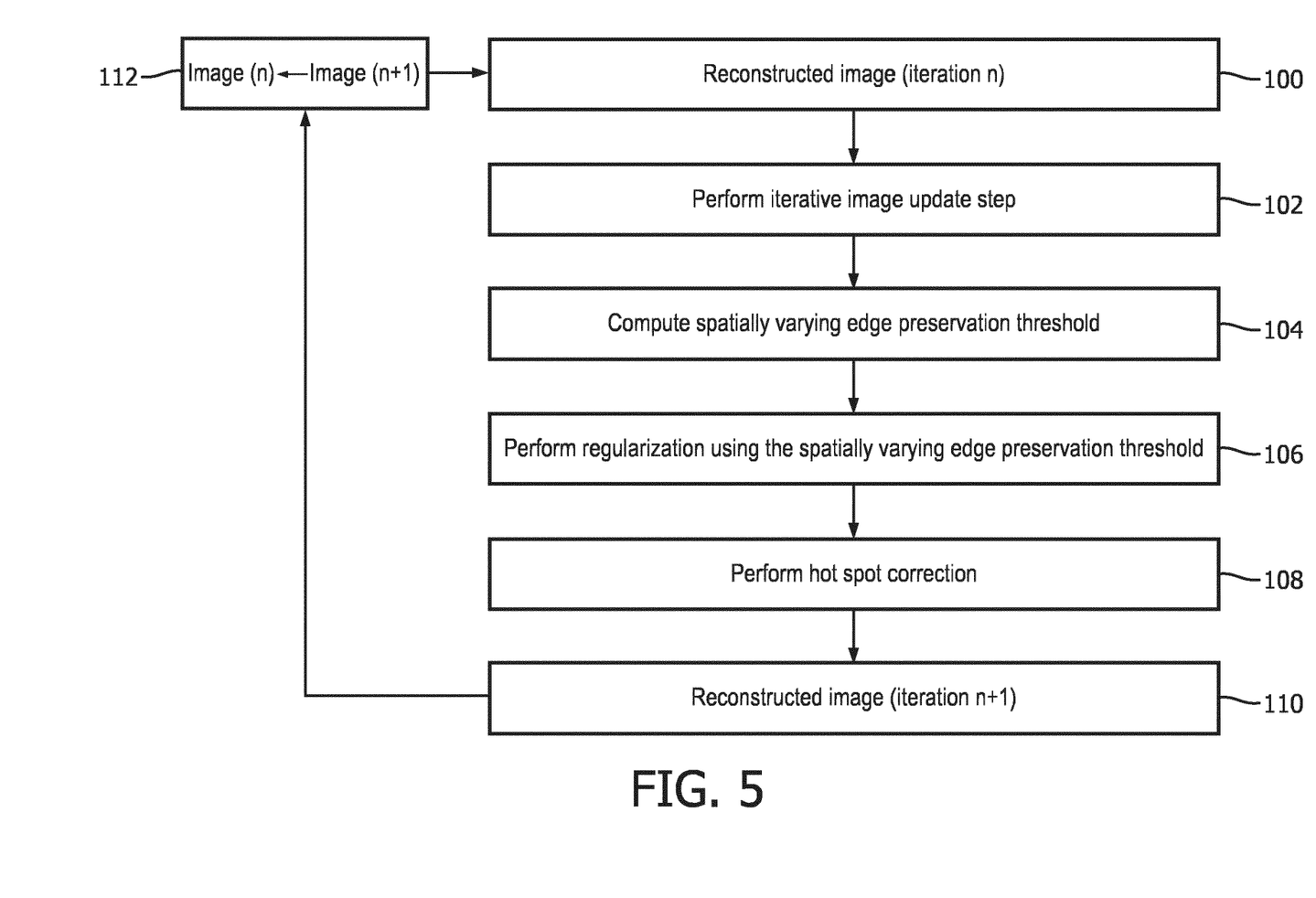
FIG. 5 diagrammatically illustrates an image reconstruction process suitably performed using the system of FIG. 1.

With reference to FIG. 5, an illustrative image reconstruction method suitably performed using the system of FIG. 1 is shown. Starting with a current reconstructed image 100 for iteration (n), an iterative image update step 102 is performed, e.g. using OSEM in the illustrative examples. In an operation 104, the spatially varying edge preservation threshold is computed based on a noise metric such as the amount of imaging data contributing to the local voxel. In an operation 106, the regularization is performed using the spatially varying edge preservation threshold. In an optional operation 108, hot spot correction is performed, e.g. suppressing image structures that are significantly smaller than the achievable imaging resolution (and hence are unlikely to be physical features). The output is the updated reconstructed image 110 for iteration (n+1), which as indicated in block 112 becomes the current iteration 100 for the next iteration.

While the illustrative examples have employed ordered subset expectation maximization (OSEM) reconstruction, other iterative reconstructions can be used instead, such as Maximum Likelihood Estimation Method (MLEM) reconstruction. Similarly, while RDP is the illustrative edge-preserving prior in the illustrative examples, more generally any edge-preserving prior having an edge preservation threshold may be used, which (as disclosed herein) has a spatially varying value at each image voxel that depends on a noise metric in a local neighborhood of the image voxel.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. An imaging device comprising:
a radiation detector array arranged to acquire imaging data;
a computer; and
a non-transitory storage medium storing instructions readable and executable by the computer to perform an image reconstruction method including:
performing iterative image reconstruction of the acquired imaging data to generate a reconstructed image; and
during the iterative image reconstruction, applying an edge preserving prior having a spatially varying edge preservation threshold, wherein a value of the edge preservation threshold at each image voxel depends on a noise metric in a local neighborhood of the image voxel.

2. The imaging device of claim 1 wherein the value at each image voxel of the spatially varying edge preservation threshold depends on an amount of the imaging data contributing to the reconstructed image in a local neighborhood of the image voxel.

3. The imaging device of claim 2 wherein the dependence of the value at each image voxel of the spatially varying edge preservation threshold on the amount of the imaging data contributing to the reconstructed image in the local neighborhood of the image voxel provides:
stronger edge preservation when the amount of the imaging data contributing to the reconstructed image in the local neighborhood of the image voxel is higher, and
weaker edge preservation when the amount of the imaging data contributing to the reconstructed image in the local neighborhood of the image voxel is lower.

4. The imaging device of claim 3 wherein the dependence of the value at each image voxel of the spatially varying edge preservation threshold on the amount of the imaging data contributing to the reconstructed image in a local neighborhood of the image voxel provides:
no edge preservation when the amount of the imaging data contributing to the reconstructed image in the local neighborhood of the image voxel is less than a threshold.

5. The imaging device of claim 1 wherein the dependence of the value at each image voxel of the spatially varying edge preservation threshold on the noise metric in the local neighborhood of the image voxel provides:
stronger edge preservation when the noise metric indicates lower noise in the local neighborhood of the image voxel, and
weaker edge preservation when the noise metric indicates higher noise in the local neighborhood of the image voxel.

6. The imaging device of claim 5 wherein the dependence of the value at each image voxel of the spatially varying edge preservation threshold on the noise metric in the local neighborhood of the image voxel provides:
no edge preservation when the noise metric is higher than a threshold.

7. The imaging device of claim 1 wherein the noise metric in the local neighborhood of the image voxel comprises an aggregation of the intensities of neighborhood image voxels of the reconstructed image in the local neighborhood of the image voxel.

8. The imaging device of claim 1 wherein the radiation detector array comprises one or more positron emission tomography (PET) detector rings arranged to acquire PET imaging data.

9. An imaging device of claim 7 comprising:
a radiation detector array arranged to acquire imaging data;
a computer; and
a non-transitory storage medium storing instructions readable and executable by the computer to perform an image reconstruction method including:
performing iterative image reconstruction of the acquired imaging data to generate a reconstructed image; and during the iterative image reconstruction, applying an edge preserving prior having a spatially varying edge preservation threshold, wherein a value of the edge preservation threshold at each image voxel depends on a noise metric in a local neighborhood of the image voxel;

wherein the noise metric in the local neighborhood of the image voxel comprises an aggregation of the intensities of neighborhood image voxels of the reconstructed image in the local neighborhood of the image voxel; and wherein the spatially varying edge preservation threshold is set to a value providing no edge preservation when the aggregation of the intensities of the neighborhood image voxels of the reconstructed image in the local neighborhood of the image voxel is less than a threshold.

10. The imaging device of claim 9 wherein the edge preserving prior comprises a Relative Difference Prior (RDP) having the spatially varying edge preservation threshold whose value at each image voxel depends on the noise metric in the local neighborhood of the image voxel;.

11. The imaging device of claim 10 wherein performing iterative image reconstruction of the acquired imaging data to generate the reconstructed image comprises performing one of Maximum Likelihood Estimation Method (MLEM) reconstruction and ordered subset expectation maximization (OSEM) reconstruction.

12. The imaging device of claim 11 wherein the image reconstruction method further includes:

during the iterative image reconstruction, reducing image values of image features of the reconstructed image that have spatial extent smaller than a threshold.

13. A non-transitory storage medium storing instructions readable and executable by a computer to perform an image reconstruction method comprising:

performing iterative image reconstruction of projection imaging data to generate a reconstructed image;

wherein the iterative image reconstruction includes performing an update step that includes an edge preserving prior having a spatially varying edge preservation threshold, wherein a value of the edge preservation threshold at each image voxel depends on an amount of the imaging data contributing to the reconstructed image in a local neighborhood of the image voxel.

14. The non-transitory storage medium of claim 13 wherein the amount of the imaging data contributing to the reconstructed image in a local neighborhood of the image voxel is computed as an aggregation of the intensities of neighborhood image voxels of the reconstructed image in the local neighborhood of the image voxel.

15. The non-transitory storage medium of claim 14 wherein the spatially varying edge preservation threshold is set to a value providing no edge preservation when the aggregation of the intensities of the neighborhood image voxels of the reconstructed image in the local neighborhood of the image voxel is less than a threshold.

16. The non-transitory storage medium of claim 13 wherein the iterative image reconstruction is one of Maximum Likelihood Estimation Method (MLEM) reconstruction and ordered subset expectation maximization (OSEM) reconstruction.

17. The non-transitory storage medium storing instructions readable and executable by a computer to perform an image reconstruction method comprising:

performing iterative image reconstruction of projection imaging data to generate a reconstructed image;

wherein the iterative image reconstruction includes performing an update step that includes an edge preserving prior having a spatially varying edge preservation threshold, wherein a value of the edge preservation threshold at each image voxel depends on an amount of the imaging data contributing to the reconstructed image in a local neighborhood of the image voxel; and wherein the dependence of the value at each image voxel of the spatially varying edge preservation threshold on the amount of the imaging data contributing to the reconstructed image in the local neighborhood of the image voxel provides: stronger edge preservation when the amount of the imaging data contributing to the reconstructed image in the local neighborhood of the image voxel is higher, and weaker edge preservation when the amount of the imaging data contributing to the reconstructed image in the local neighborhood of the image voxel is lower.

18. A non-transitory storage medium storing instructions readable and executable by a computer to perform an image reconstruction method comprising:

performing iterative image reconstruction of projection imaging data to generate a reconstructed image;

wherein the iterative image reconstruction includes performing an update step that includes an edge preserving prior comprising a Relative Difference Prior (RDP) having a spatially varying edge preservation threshold whose value $y'_j$ at each image voxel j depends on an amount of the imaging data contributing to the reconstructed image in a local neighborhood of the image voxel j.

* * * * *